US012058040B2

(12) United States Patent
Gupta et al.

(10) Patent No.: US 12,058,040 B2
(45) Date of Patent: Aug. 6, 2024

(54) AUTO-GROUPING AND ROUTING PLATFORM

(71) Applicant: HEWLETT PACKARD ENTERPRISE DEVELOPMENT LP, Houston, TX (US)

(72) Inventors: Dilip Gupta, Santa Clara, CA (US); Harish Magganmane, Santa Clara, CA (US); Stephen Su, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/499,804

(22) Filed: Oct. 12, 2021

(65) Prior Publication Data

US 2023/0110199 A1    Apr. 13, 2023

(51) Int. Cl.
*H04L 45/42* (2022.01)
*H04L 12/46* (2006.01)
*H04L 45/02* (2022.01)
*H04L 45/24* (2022.01)
*H04L 45/586* (2022.01)

(52) U.S. Cl.
CPC .......... *H04L 45/42* (2013.01); *H04L 12/4641* (2013.01); *H04L 45/02* (2013.01); *H04L 45/24* (2013.01); *H04L 45/586* (2013.01)

(58) Field of Classification Search
CPC ..... H04L 45/42; H04L 12/4641; H04L 45/02; H04L 45/24; H04L 45/586
USPC .................................................. 709/238, 283
See application file for complete search history.

(56) References Cited

U.S. PATENT DOCUMENTS

| 7,266,715 B1 * | 9/2007 | Bazzinotti | H04L 69/40 |
| | | | 714/4.21 |
| 7,376,743 B1 * | 5/2008 | Bazzinotti | H04L 67/1008 |
| | | | 709/229 |
| 8,443,435 B1 * | 5/2013 | Schroeder | H04L 63/08 |
| | | | 726/15 |

(Continued)

FOREIGN PATENT DOCUMENTS

| WO | WO-2013116384 A1 * | 8/2013 | ......... H04L 41/0654 |
| WO | WO-2020041566 A1 * | 2/2020 | ............ H04W 16/32 |

OTHER PUBLICATIONS

Session-Based Tunnel Scheduling Model in Multi-link Aggregate IPSec VPN Yunhe Zhang;Zhitang Li;Song Mei;Cai Fu 2009 Third International Conference on Multimedia and Ubiquitous Engineering Year: 2009 | Conference Paper | Publisher: IEEE (Year: 2009).*

(Continued)

*Primary Examiner* — Jeffrey R Swearingen
(74) *Attorney, Agent, or Firm* — Sheppard Mullin Richter & Hampton LLP

(57) ABSTRACT

Systems and methods are provided for automatically grouping branch devices based on device information (e.g., IPSec tunnel connectivity, etc.). The devices with similar branch gateways which would customarily receive similar route information and/or properties (e.g., AS-PATH, cost, MED, Metric1, Metric2, community/extended community) and/or devices with similar connectivity graphs can be grouped together. This can reduce the number of electronic communications transmitted throughout the network and increase computational efficiency for the controller and devices.

20 Claims, 9 Drawing Sheets

(56) References Cited

U.S. PATENT DOCUMENTS

| | | | | |
|---|---|---|---|---|
| 10,680,965 | B1* | 6/2020 | Pingale | H04L 47/6225 |
| 10,778,537 | B1* | 9/2020 | Hu | H04L 41/12 |
| 11,658,882 | B1* | 5/2023 | Godfrey | G06F 3/0484 |
| | | | | 715/736 |
| 2007/0162614 | A1* | 7/2007 | Patel | H04L 45/28 |
| | | | | 709/239 |
| 2010/0220736 | A1* | 9/2010 | Mohapatra | H04L 45/04 |
| | | | | 370/401 |
| 2013/0329599 | A1* | 12/2013 | Barkan | H04L 45/02 |
| | | | | 370/254 |
| 2016/0134482 | A1* | 5/2016 | Beshai | H04L 45/745 |
| | | | | 370/254 |
| 2016/0308993 | A1* | 10/2016 | Rai | H04L 67/54 |
| 2017/0064749 | A1* | 3/2017 | Jain | H04L 67/1097 |
| 2017/0195180 | A1* | 7/2017 | Ng | H04L 43/0882 |
| 2018/0351862 | A1* | 12/2018 | Jeganathan | H04L 45/02 |
| 2019/0207844 | A1* | 7/2019 | Kodavanty | H04L 12/4633 |
| 2020/0280494 | A1* | 9/2020 | Effendy | H04L 45/125 |
| 2022/0141190 | A1* | 5/2022 | Olson | H04L 67/104 |
| | | | | 726/15 |

OTHER PUBLICATIONS

EPH: An Efficient and Robust Group Membership Topology for Distributed Systems Ravi Madipadaga; Sabishaw Bhaskaran; Saikat Mukherjee 2018 14th International Wireless Communications & Mobile Computing Conference (IWCMC) Year: 2018 | Conference Paper | Publisher: IEEE (Year: 2018).*

Performance enhancement in IEEE 802.15.4 wireless sensor networks by link-quality based node grouping Young-il Kim;Won Ryu; Jong-Tae Lim 2013 15th International Conference on Advanced Communications Technology (ICACT) Year: 2013 | Conference Paper | Publisher: IEEE (Year: 2013).*

Cisco, "Configuring Auto-Anchor Mobility," Aug. 6, 2019, Cisco Wireless Controller Configuration Guide, Release 8.1, <https://content.cisco.com/chapter.sjs?uri=/searchable/chapter/content/en/us/td/docs/wireless/controller/8-1/configuration-guide/b_cg81/b_cg81_chapter_010010.html.xml>, 4 pages.

Robert Sheldon, "split horizon," Aug. 2021, <https://www.techtarget.com/searchnetworking/definition/split-horizon>, 7 pages.

* cited by examiner

AUTO-GROUPING AND ROUTING PLATFORM

BACKGROUND

Software defined wide area networks (SDWANs) are network topologies that interconnect sites of a wide area network (WAN) using the principles of software defined networking (SDN), such as the separation of the control layer of traffic management from the data forwarding layer. SDWANs support infrastructure consolidation through network function virtualization (NFV). NFV reduces the administrative overhead and hardware cost of adding network functions to a WAN by virtualizing the network functions using virtual machines on more common and cheaper "commodity" hardware.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
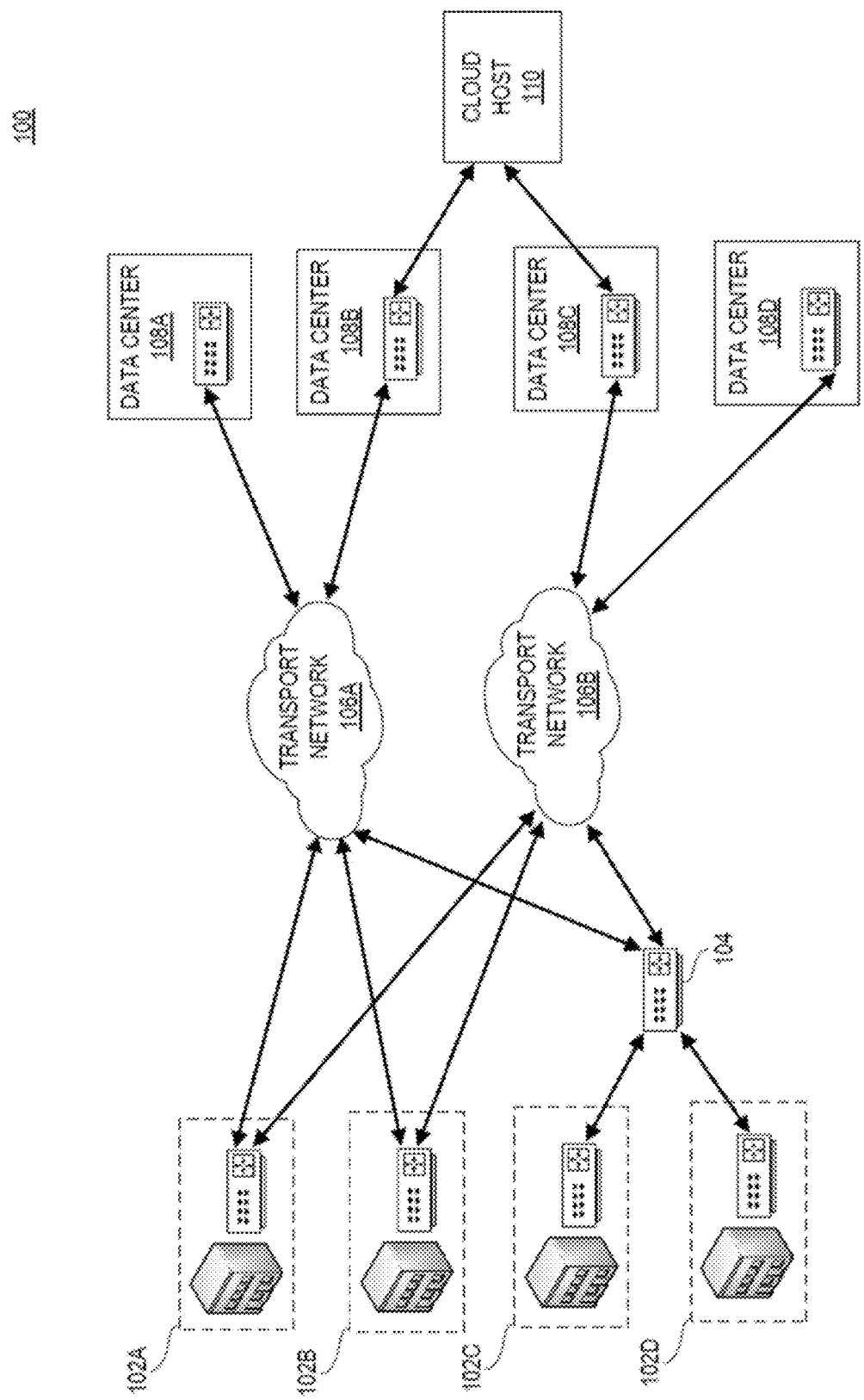
FIG. 1 illustrates an example SDWAN environment in accordance with embodiments of the technology disclosed herein.

The figures are not exhaustive and do not limit the present disclosure to the precise form disclosed.

DETAILED DESCRIPTION

A software defined wide area network (SDWAN) allows a network administrator to connect branch locations to a core site over a wide area network (WAN). The use of software defined networking (SDN) decouples network traffic decisions from the various devices within the network, such as routers, switches, bridges, and other common network devices. This decoupling essentially turns each networking device into a simple packet forwarding device. The SDWAN sets the potential traffic paths through each network device based on client policies (e.g., QoS requirements, bandwidth, etc.) to connect the branch locations within the SDWAN to the core site or data center, which is provided to each network device over a control channel. Instead of making a decision on how to route traffic when data is received, the network devices simply execute the route identified by the SDWAN administrator.

As alluded to above, the use of a SDWAN facilitates virtualization of network services across the WAN. Network function virtualization (NFV) reduces the administrative overhead and hardware cost of adding network functions to a WAN by virtualizing the network functions using virtual machines on more common and cheaper "commodity" hardware, rather than proprietary, dedicated hardware (as traditionally required). For example, functions like routing, load balancing, and firewalls may be operated as virtual machines (VMs) hosted at a data center and/or in the cloud. However, NFV focuses on virtualizing functions, but does not concern itself with how data packets are routed to the virtual machines running the network functions. SDWAN combined with NFV provides a more fully realized virtual network, where the SDWAN provides the routing policies for traffic flows from branch locations to the core site or data center hosting the NFV virtual machines. Branch users are capable of utilizing these resources through the SDWAN, reducing reliance on expensive proprietary hardware and reducing the amount of computing hardware required at branch sites of the WAN.

SDWANs may be implemented by creating a virtual overlay that is transport-agnostic and abstracts underlying private or public network connections. These network connections may include Multiprotocol Label Switching (MPLS), internet broadband, fiber, wireless or Long Term Evolution (LTE), to name a few. In some examples, virtual private network (VPN) tunnels are created between WAN sites to allow for private, secure interconnection across potentially vulnerable and insecure public links (e.g. Internet links). Clients may maintain existing WAN links and implement an overlay SDWAN using these tunnels to optimize bandwidth by directing WAN traffic to and from other WAN sites using identified routes that include these tunnels. Accordingly, SDWANs may be used to centralize network control across the entire WAN. Remote users, such as branch users, are capable of utilizing resources hosted at a data center and/or the cloud to run applications within the network.

Typically, SDWAN vendors rely on the border gateway protocol (BGP), a standardized exterior gateway protocol, to exchange routing and reachability information between systems to effectuate an SDWAN. However, with BGP, knowledge of the routes are federated (e.g., an aggregated, single source of data that is generated in a virtual memory from distributed sources to create a common data model), and multiple layers are needed to support large numbers of branches, and requires a tenant/customer to configure pairs of BGP instances. For example, in an SDWAN where the number of branches can be quite large, standard BGP mechanisms may not be sufficient or practical to use.

In an SDWAN architecture that embodies a single layer architecture, each device/router may communicate directly with an orchestrator (e.g., to achieve SDWAN, routing between branch gateways, and virtual private network clients (VPNCs) may be performed, etc.). An orchestrator comprises storage network architecture, provided in a self-contained virtual machine that serves to assess the health of physical ports with fabric monitoring, end-to-end diagnostics, and predefined templates to reduce configuration errors. This routing can be implemented as a cloud-based overlay routing service.

Each branch gateway can publish its locally learned and statically configured prefixes to the overlay routing service (a prefix or routing prefix can identify an address of a network, and routes can be determined/configured between prefixes), in particular to one of a plurality of CBS servers. CBS servers can send route updates to branch gateways that pass such route updates to an underlay routing stack at the tenant. branch gateways connect to CBS servers via a channel that is load balanced to a particular CBS server. Branch gateways can perform re-synchronization to achieve a common state with the CBS servers/overlay routing service, after which the branch gateways will again publish learned routes (along with any relevant tunnel flaps), at which point, the CBS servers will publish these state updates to any PCMs in a given cluster. The publishing of these state updates will trigger new route calculations in each PCM, and thereafter, the PCMs will publish new updates to all CBS servers, which in turn, will distribute updates to any relevant branch gateways.

Another limitation of standard border gateway protocol (BGP) mechanisms involves processing and memory limitations when implementing a network with a large number of nodes. For example, the BGP may define the route information, but is functionally limited based on real-world analytics of processing or memory limitations. When the number of nodes changes from its original value or attempts to support a large number of nodes (e.g., 1,000, etc.), each of the nodes would need to compute the route information with a network change and broadcast that information to other nodes. With the large number of nodes, the processing capabilities of these nodes is dedicated to recomputing route information and, often, administrative support is needed to define the new routes. As such, determining and maintaining accurate routing table data is difficult, slow, and static.

Additionally, BGP is a distributed routing protocol, where each node advertises its route information to its neighbor node. Based on the route information received, each node within the network can compute its own best routes. For networks with hundreds or thousands of nodes, it is increasingly difficult to design network changes or layout and/or troubleshoot any issues with such a big network.

Embodiments of the present disclosure incorporate an improved network controller to determine node routes based on advertisements from each node (e.g., unicast, etc.). The system can automatically group branch devices based on device information (e.g., IPSec tunnel connectivity, etc.). The devices with similar branch gateways which would customarily receive similar route information and/or routing properties (e.g., values used by the BGP algorithm to determine a path selection, including autonomous system (AS) path, cost, multiple exit discriminator (MED) metric, Metric1, Metric2, community/extended community) and/or devices with similar connectivity graphs can be grouped together (wherein the connectivity graphs depict vertices connected with edges to demonstrate the presence of shared resources by connecting devices if they share similar gateways such as the same primary gateway and secondary gateway). This can reduce the number of electronic communications transmitted throughout the network and increase computational efficiency for the controller and devices.

In a sample illustration, for Hub and Spoke connectivity (e.g., a central component connected to multiple communication networks around it) of node-1 through node-100 may all connect to the same Hub node-1. As such, nodes 1-100 and Hub node-1 can be grouped together as one group. The routes for the group can be computed once as a group rather than computed separately by each node.

In addition, as a group, instead of computing only the best routes (e.g., the fastest routes, the least number of hops, etc.), the second best routes or the third best routes may also computed at the same time. The best routes and alternative best routes may be downloaded to each device in the group, so in time of network disruptions, each node can switch to alternate best routes without the need for route re-computation.

The routing data may be maintained by the controller and dynamically updated as new nodes are added. The routing decision may be maintained by the controller in centralized servers or in the cloud. Compared to a distributed approach, the centralized decision can reduce the need to upgrade to new router hardware as the network expands. This can also help prevent the need to continuously add new router hardware to help route packets or update routing tables and also reduce any manual operation to add these routes to the routing table.

FIG. 1 illustrates an example SDWAN 100 in which embodiments of the technology disclosed herein are applicable. The example SDWAN 100 is simplified for ease of discussion, and a person of ordinary skill in the art would understand that the technology of the present disclosure is applicable to SDWANs with architectures of greater or lesser complexity. As illustrated in FIG. 1, the example SDWAN 100 includes a plurality of remote locations 102*a*, 102*b*, 102*c*, 102*d*, each with an SDWAN node device. An SDWAN node device is a networking device, such as a router, switch, modem, bridge, hub, or other common network device, which serves as a gateway to, or intermediate point within, the SDWAN. Remote locations 102*a*, 102*b*, 102*c*, 102*d* could be a branch office or other user located a distance from a network core site, such as a data center. In various embodiments, the core site is the entity which hosts virtualized network functions (VNFs) that may be shared by all of the remote locations 102*a*, 102*b*, 102*c*, 102*d*. In various embodiments, the SDWAN node device at the remote locations 102*a*, 102*b*, 102*c*, 102*d* is configured to act as an edge device for the remote location, providing an entry point to the SDWAN 100. The SDWAN node device at remote locations 102*a*, 102*b*, 102*c*, 102*d* may comprise a modem or other gateway networking device in various embodiments.

In various embodiments, the traffic between remote locations and the data centers may be routed through an intermediate SDWAN node device 104. Intermediate SDWAN node device 104 may be similar to the SDWAN node devices at remote locations 102*a*, 102*b*, 102*c*, 102*d* and data centers 108*a*, 108*b*, 108*c*, 108*d*. Intermediate SDWAN node device 104 may serve as the access point to the transport networks 106*a*, 106*b* of SDWAN 100 for a plurality of remote locations. Thus, SDWAN node device 104 may be thought of as a branch gateway, and SDWAN node devices at remote locations 102*a*, 102*b*, 102*c*, 102*d* can be thought of as Virtual Private Network Concentrators (VPNCs). As illustrated in FIG. 1, remote locations 102*c* and 102*d* may be connected to intermediate SDWAN node device 104. Using one or more intermediate devices, like intermediate SDWAN node device 104, within the SDWAN enables the creation of different service regions, in some embodiments.

SDWAN 100 further includes one or more data centers 108*a*, 108*b*, 108*c*, 108*d*. Each data center 108*a*, 108*b*, 108*c*, 108*d* also has an SDWAN node device, similar to the SDWAN node device at remote locations 102a, 102b, 102c, 102d. In various embodiments, data centers 108a, 108b, 108c, 108d may host one or more applications which may be used by users at the remote locations 102a, 102b, 102c, 102d. In various embodiments, one or more data centers may be managed by the client that owns the SDWAN 100. In other embodiments, one or more data centers may be managed by a third party service provider.

Each transport network 106a, 106b may be associated with a set of data centers. As illustrated in FIG. 1, transport network 106a is associated with data centers 108a, 108b, while transport network 106b is associated with data centers 108c, 108d. In various embodiments, some applications may be hosted in cloud host 110, which may be accessed by one or more data centers associated with either transport network 106a or 106b. As illustrated in FIG. 1, data centers 108b and 108c provide access to at least one cloud application hosted in the cloud host 110.

Each remote location 102a, 102b, 102c, 102d is connected through the SDWAN node device to transport networks 106a, 106b. Transport networks 106a, 106b include different transport technologies, such as public Internet, multiprotocol label switching (MPLS), private Internet, asynchronous transfer mode, wireless WAN, broadband, satellite communications, or other network technologies. In various implementations, transport networks may be networks of various different service providers. As illustrated, the SDWAN 100 may include more than one transport network (transport networks 106a, 106b). SDWAN 100 may provide a method of defining a client network, overlaid on existing transport infrastructures of service providers for the physical routing of SDWAN traffic between different SDWAN node devices. Although only two transport networks 106a, 106b are shown in FIG. 1, various embodiments may include other quantities of transport networks, providing additional flexibility in how application traffic is routed from remote locations 102a, 102b, 102c, 102d to the associated data center 108a, 108b, 108c, 108d hosting the application. Data centers 108a, 108b, 108c, 108d include their own SDWAN node devices, providing access to the SDWAN 100 by servers and other components of the respective data center.

Within SDWAN 100, connectivity between remote locations with the data centers and/or cloud applications may be controlled via control software hosted by the SDWAN administrator. The client may develop policies focused on ensuring different traffic classes are routed within the network such that quality of service (QoS) and service level agreement (SLA) requirements are met. For example, the client can determine a minimum availability time (e.g., 23 hours per day, etc.), bandwidth, delay, and error rate for high-priority applications and traffic under limited network capacity provided by the SDWAN administrator. In another example, the client can define an expected level of service (e.g., quality, availability, responsibilities, etc.) provided by the SDWAN administrator. These policies are used to develop routing tables, which are distributed to the SDWAN node devices (like the SDWAN node devices described with respect to FIG. 1). The SDWAN node devices may identify the traffic from the different sessions streaming through the SDWAN node device and apply the routing rules embodied in the routing table for that category of traffic. To ensure that the requirements are met, clients may focus on traffic engineering principles (e.g., one or more applications may divert network traffic on a communication link based on the link properties, like Dynamic Packet State (DPS) policies, etc.), modifying the route certain traffic take through the transport networks to meet requirements. For example, a network administrator may set rules for a particular traffic class such that it is generally transmitted through the SDWAN node device of a branch office to an intermediate SDWAN node device (to apply DPI), and then over the public Internet transport network to a data center. However, in certain scenarios, the same traffic may be transmitted over an MPLS network. Accordingly, the SDWAN node devices and the data paths between branch offices and the data centers/cloud architecture may be determined before installation.

Figure 2:
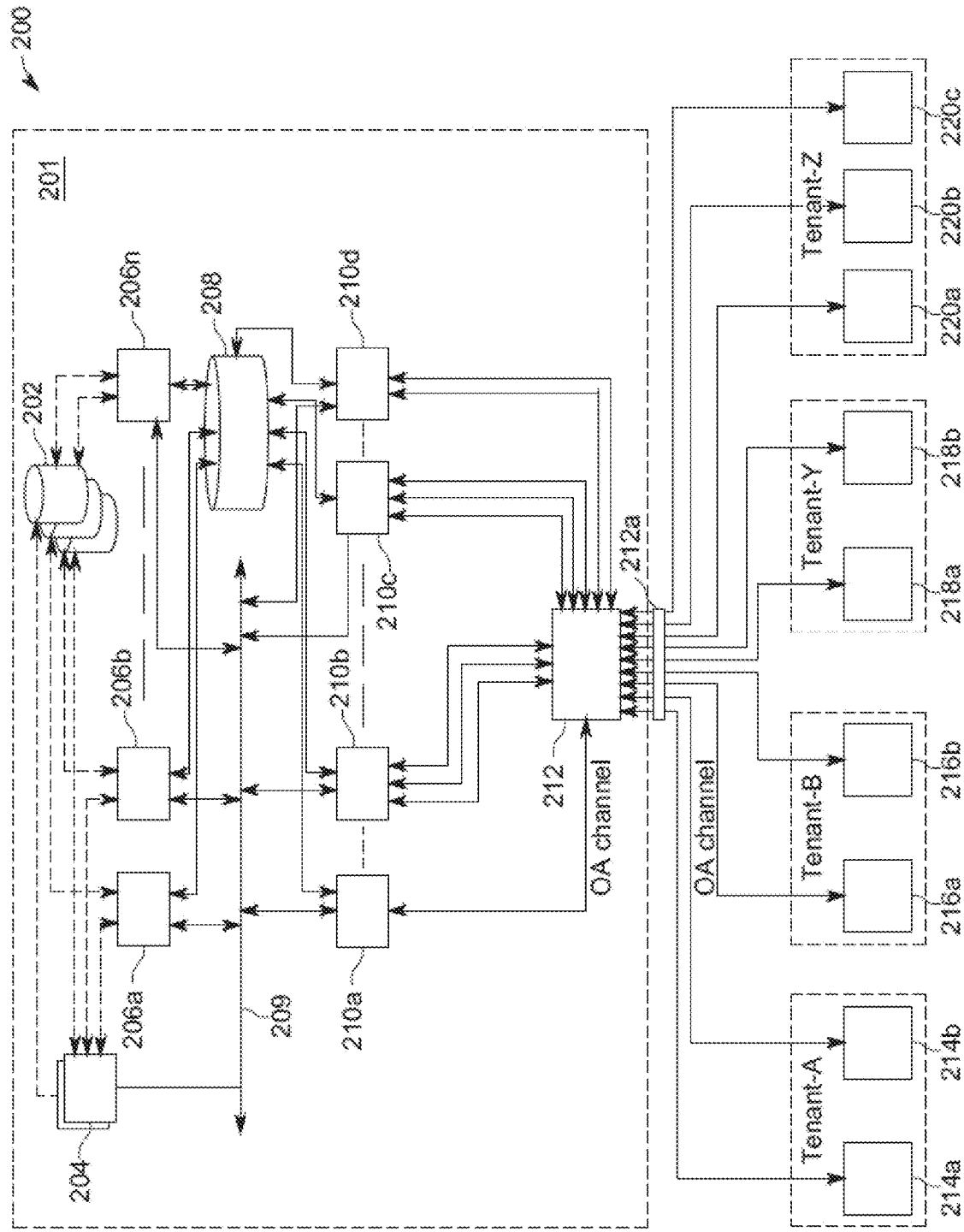
FIG. 2 illustrates an example system architecture of a SDWAN overlay routing service in accordance with embodiments of the technology disclosed herein.

FIG. 2 illustrates an example system architecture 200 for effectuating an SDWAN overlay routing service or controller computing device (SORS) 201 in accordance with one embodiment. As illustrated in FIG. 2, each tenant (e.g., tenants A-Z) may have respective branch gateways and/or VPNC overlay agents (OAs) (used interchangeably). For example, tenant A may have branch gateways 214a, 214b, tenant B may have branch gateways 216a, 216b . . . , tenant Y may have branch gateways 218a, 218b, and tenant Z may have branch gateways 220a-c. Each branch gateway may be configured to connect to SORS 201 using a channel. Each branch gateway, via its respective channel, can publish its locally learned and statically configured prefixes to SORS 201. Each channel may use an open source remote procedure call (RPC), such as gRPC, which uses HTTP/2 for transport purposes. This enables the creation of multiple, bidirectional streaming over the same TCP connection. Thus, each application, e.g., routing service, tunnel service, etc., may create its own stream. It should be noted that in order to isolate SORS 201 control plane traffic from other management traffic, a specific domain name system (DNS) domain name and corresponding virtual IP (VIP) address may be specified for SORS 201.

It should be understood that each branch gateway can connect to an underlay routing daemon (e.g., a server process running in background processes that can update a routing table but does not require manual intervention, like a route command). The underlay routing daemon can obtain the statically configured prefixes (e.g., each branch gateways and/or VPNC overlay agents can publish its locally learned and statically configured prefixes to the underlay routing daemon). A CBS server, such as one of CBS servers 210a-d (described in greater detail below) may send route updates to its corresponding branch gateway, which in turn will forward the route updates to the underlay routing daemon. In this way, the underlay routing daemon can configure the prefixes, which each branch gateway will ultimately publish to SORS 201.

Each branch gateway 214a/b, branch gateway 216a/b, branch gateway 218a/b, branch gateway 220a/b/c can publish the locally learned and statically configured prefixes to SORS 201 vis-à-vis an elastic load balancing (ELB) component 212a (e.g., a web server that can also be used as a reverse proxy, load balancer, mail proxy, and HTTP cache, etc.).

In some examples, ELB 212a performs Layer 4 load balancing. That is, ELB 212a can perform load balancing of host-to-host communication services for the OSI transport layer, and then may forward the channel data to an reverse-proxy/load-balancer cluster 212. That is, ELB 212a performs Layer 4 load balancing upon accepting channel data for distribution to the reverse-proxy/load balancing cluster 212 which effectuates HTTP termination and acts as an intermediary proxy service for passing the channel data into SORS 201. ELB 212a (or similar/equivalent function) may be implemented as an entry point into the cloud. The reverse-proxy/load-balancer cluster 212 can terminate each channel (which may be secure), and can establish a plain-text channel to one of the CBS servers, e.g., CBS servers 210a-d. In some embodiments, custom headers of data packets transmitted on the channels can be used as a basis for selecting a particular CBS server to which an channel is routed. In some embodiments, a branch gateway (e.g., branch gateway 214a) may insert such custom headers to indicate a tenant identifier and or other relevant fields.

Each of CBS servers 210a-210d may host the channel(s) routed thereto. Each of CBS servers 210a-210d can be responsible for distributing the routes generated by the PCM to all interested branch gateways of a tenant anchored to the particular CBS server (or set of CBS servers). It should be noted that all branch gateways belonging to the same tenant can be anchored to a particular CBS server or set of CBS servers. This can be done in some embodiments to optimize memory usage on CBS servers, where without such memory optimization, all CBS servers in SORS 201 would have to cache all the states/prefixes of all the tenants connected to each of the CBS servers.

In the "reverse direction," and as noted above, each of the CBS servers 210a-210d can be used to publish the prefixes and any routing updates received from a branch gateway (e.g., one or more of branch gateways 214a/b, 216a/b, 218a/b, 220 a-c) to each PCM. In the event of a CBS server failure, reverse-proxy/load-balancer cluster 212 will forward channel connections to active CBS servers, and branch gateways/VPNCs can re-synchronize their respective states with an active CBS. The active CBS can update redis cluster 208 and send a corresponding notification through message broker 209 (e.g., a module that translates a message from the formal messaging protocol of the sender to the formal messaging protocol of the receiver) and redis cluster 208 (described below).

In some embodiments, a combination of monitoring scripts and periodic data comparison can be performed by a redis cluster 208 of redis instances, where redis keys are shared across multiple redis instances making up redis cluster 208. Redis cluster 208 may have slave nodes for resiliency/redundancy purposes. The data compared may be route state and tunnel status data. It should be understood that redis can refer to an in-memory data structure store that can be used as a database, cache, and message broker. Data loss in a redis cluster such as redis cluster 208 can occur due to a redis node failing, or a redis node being rebooted, for example. Upon an occurrence of either a failure or reboot, data reflecting the latest state of the branch gateways can be repopulated in redis cluster 208 by CBS servers 210a-210d. CBS server 210a-210d may then notify each PCM 206a, b . . . n and PCM scheduler 204 (described in greater detail below) to recompute routes between branch gateways and VPNCs for each of its associated tenant(s).

PCM scheduler 204 (which can comprise a plurality of PCM scheduler instances) can be used to handle tenant assignment, e.g., map PCMs, e.g., PCMs 206a-n to tenants, e.g., tenants A-Z. It should be understood that tenant assignment may be dynamic, and PCMs 206a-n can be configured to operate on some set of tenants on-demand. Moreover, all PCMs can be configured to act as slaves to the PCM scheduler instances 204.

In operation, branch gateways 214a/b, 216a/b, 218a/b, 220a-c may connect to CBS servers 210a-d via respective channels as discussed above. In turn, the state of the branch gateways/VPNCs (i.e., route(s) and link status) published by the respective branch gateway are pushed to redis cluster 208 by the appropriate CBS server 210a-210d. Additionally, each CBS server 210a-210d may put notifications indicative of the new branch gateways/VPNCs state onto a message broker 209, such as a Kafka or RabbitMQ message broker, as well as onto the redis cluster 208. It should be understood that redis cluster 208 and message broker 209 may co-exist in the event state notifications may not scale (e.g., if the same event is posted on redis cluster 208 and message broker 209 then the state notifications may not scale, etc.) to required high-write throughput conditions. This allows PCM scheduler 204 to pick up any notifications from message broker 209, and if a tenant is not yet assigned to a PCM, PCM scheduler 204 can map that as-of-yet unassigned tenant to an appropriate PCM, e.g., one of PCMs 206a-d. For PCMs that have already been assigned/mapped to a tenant(s), such PCMs may simply listen for updates on tenant-specific redis queues via the redis nodes comprising redis cluster 208.

It should be noted that each of CBS servers 210a-d may act as a helper for pre-sorting state notifications on a per-tenant basis. Moreover, PCMs that are assigned tenants can continue to pull state notifications from the aforementioned redis queues. Accordingly, these PCMs are not necessarily gated by PCM scheduler 204. PCM scheduler 204 may consider one or more of the following factors for scheduling purposes: the number PCMs that are alive/active; the number of devices, e.g., SDWAN nodes, associated with each tenant; the number of tunnels allocated to a tenant; as well as the latest state/configuration update for a tenant. The number of alive PCMs, tenant devices, and tenant tunnels can be used for load balancing purposes when mapping or assigning tenants to PCMs. The latest state/configuration update associated with a tenant can be used to disassociate or de-map a least recently used tenant from a PCM. Further still, PCM scheduler 204 can store tenant-to-PCM mapping information, as well as tenant-relevant information, e.g., the number of devices and tunnels associated with a tenant in a distributed key-value (KV) store 202, such as etcd. Storage of such information can be used to recover PCM scheduler 204 in the event of a failure or reboot.

In some embodiments, PCM scheduler 204 can discover all PCMs of SORS 201 using distributed KV store 202. As noted above, distributed KV store 202 can be used to store PCM-tenant mapping information, and PCM scheduler 204 can discover PCMs using tenant identification information to find a corresponding PCM. It should be noted that distributed KV store 202 can also be used to provide distributed locking, monitoring via pub/sub (e.g., pub/sub is a form of asynchronous service-to-service communication used in serverless and microservices architectures, where any message published to a topic is immediately received by all of the subscribers to the topic) real-time event messaging, service discovery, as well as leadership election. In some examples, the pub/sub messaging may correspond with asynchronous service-to-service communication used in serverless and microservices architectures.

Regarding leadership election, and as alluded to above, PCM scheduler 204 can be made up of a plurality of PCM scheduler instances. In some embodiments, one PCM instance can be elected to be a master PCM scheduler, while the remaining PCM scheduler instances can be configured as backup PCM schedulers. Thus, in the event a master PCM scheduler goes down or fails, the distributed KV store 202 can be used for election of a new master PCM scheduler from one of the backup PCM schedulers. A newly elected master PCM scheduler can load a current PCM scheduler state from the distributed KV store 202 (recalling that distributed KV store 202 can be used to store/backup tenantto-PCM mapping and tenant-relevant information on behalf of PCM scheduler 204). In some embodiments, a new master PCM scheduler can obtain the latest tenant-PCM assignments for each PCM, and can reconcile those assignments based on what is stored in distributed KV store 202.

Returning to PCM discovery, each PCM 204a-d can register itself with the distributed KV store 202 (e.g., by providing a name, IP address of the PCM/node, allocation range of endpoints on the PCM/node, etc.) whenever the PCM comes up, and each PCM 204a-d can unregister itself prior to going down. PCM scheduler 204 can initiate a client gRPC connection to each discovered PCM, and can periodically run PCM health checks. The following is a non-limiting list of RPCs that can be requested by PCM scheduler 204: "keep-alive/health-check" RPC; "load tenant" RPC (which refers to loading a tenant's current state from redis cluster 208 and performing a full route recompute); "unload tenant" RPC (which refers to relinquishing tenant ownership by a PCM and flushing any/all state updates performed on the tenant and captured in redis cluster 208); "full compute" RPC (for performing a full tenant route recompute (when data loss, described above, is detected and/or when a notification queue is full, and no updates can be picked up); "get current" RPC (for reconciling tenant assignments between PCM scheduler 204 and any one or more PCMs 206a-n); "clear tenant" RPC (which can be performed to clear/invalidate a tenant's data, but the tenant's current state is not flushed to redis cluster 208); and "clear all tenants" RPC (which can be performed, similar to the clear tenant RPC, but for all rather than an individual tenant, to clear the state of a PCM when health is restored to the PCM).

Each PCM (e.g., PCMs 206a-206n) can create routes between SDWAN nodes (based on the underlay routing daemon and by way of the branch gateways), which can then be published to all CBS servers in a cluster of PCMs. It should be understood that because PCM is a cloud microservice, depending on the number of customers/tenants, routes, tunnels, etc., the number of PCM nodes in a PCM cluster can increase/decrease commensurately. It should be understood that a PCM cluster may be configured to serve multiple different tenants (determined through a provisioning process described below), but a tenant will be served by only a single PCM cluster to avoid issues with synchronizing tenant-PCM mapping. In some embodiments, during provisioning, a set of tenants will be hard bound to a PCM cluster having the requisite number of PCM nodes, and the binding can be based on the number of tenant prefixes (routes), the number of tenant devices, etc.

If a PCM fails or crashes for some reason, PCM scheduler 204 (based on keep-alive/health check RPCs requested by PCM scheduler 204, will eventually become aware of the failure/crash. PCM scheduler 204 can reassign any tenants mapped to the downed PCM to another PCM. If PCM scheduler 204 is unable to connect to a particular PCM, e.g., due to some network partitioning, PCM scheduler 204 can reassign tenants mapped to that unreachable PCM after some time period/timeout duration. A PCM may also detect that it is no longer connected to PCM scheduler 204, and after some time period/timeout duration (that can be the same or different from that of PCM scheduler 204), the PCM can quarantine itself by not acting on any notifications from its associated CBS server. In this way, it can be ensured that two or more different PCMs are not acting on the same tenant at the same time. It should be understood that FIG. 2 is an example architecture, and the number of components, manner of connection/interaction between those components, etc. can differ in accordance with other embodiments.

Figure 3:
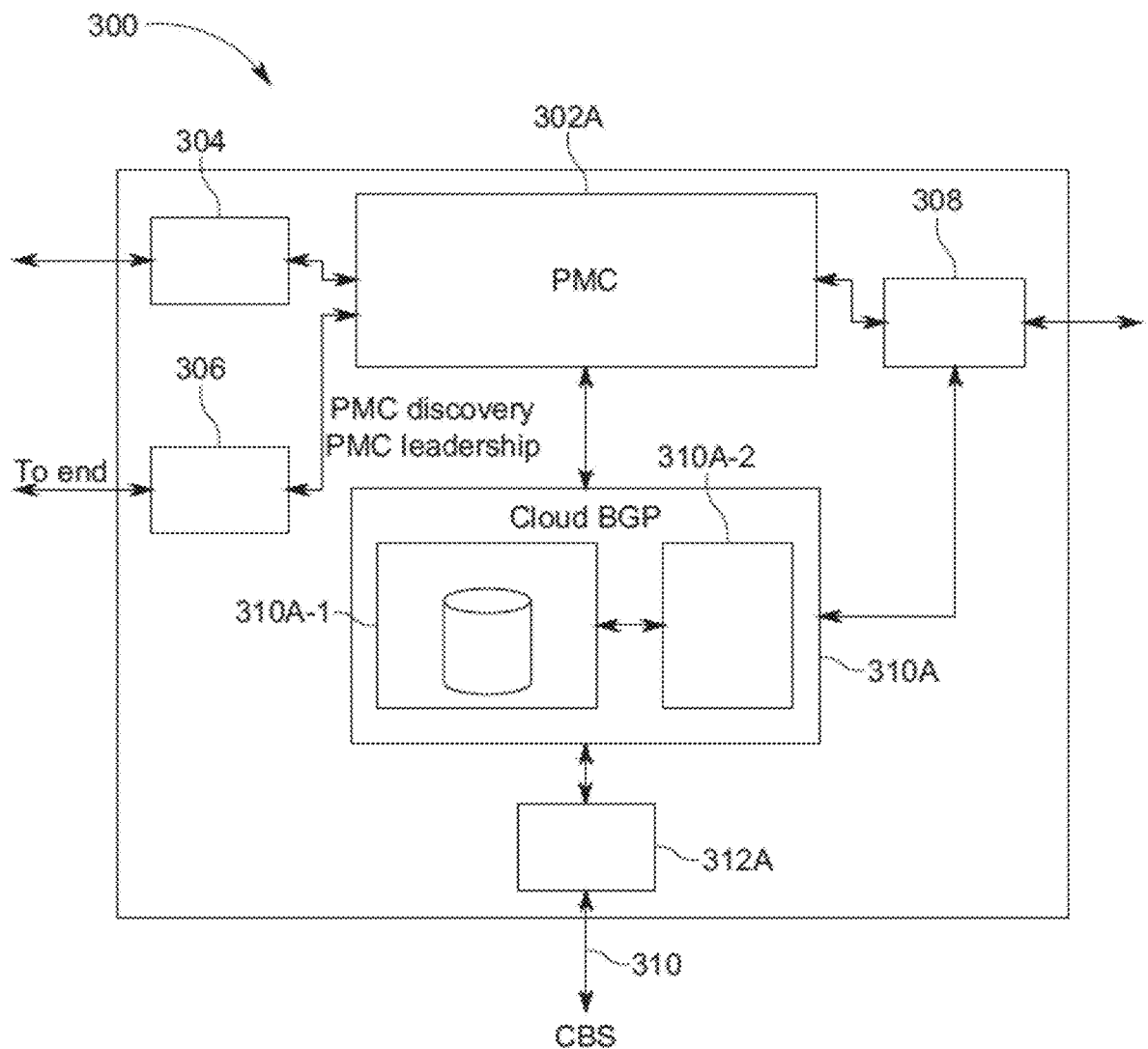
FIG. 3 illustrates a schematic representation of an example path computation module service in accordance with embodiments of the technology disclosed herein.

FIG. 3 illustrates a schematic representation of a PCM service instance in accordance with one embodiment. As illustrated in FIG. 3, PCM service instance 300 may comprise a PCM 302A, which may be an embodiment of a PCM, such as PCM 206a (described above with reference to FIG. 2). As described above, PCM 302A may compute or create routes within a SDWAN based on prefixes/states received from an underlay routing daemon and published by a tenant device (e.g., branch gateway) via a channel. Accordingly, PCM service instance 300 can include a configuration/tunnel interface 304. For debugging purposes, PCM 302 may include a REST server with monitoring/debugging APIs 308 to expose internal states of various elements or components. Such APIs 308 can be queried to obtain this internal state information.

PCM 302A can publish (after any requisite synchronization/re-synchronization) to a branch gateway. Communication via the channel can be effectuated through a CBS server, where each channel may use an RPC, such as gRPC 312A, for transport purposes. FIG. 3 illustrates a cloud BGP instance 310A hosted or executed on such a CBS server. Typically, as discussed above, implementation of a SDWAN is effectuated using BGP, but standard BGP may not be practical, and may not allow for the requisite scaling contemplated in accordance with various embodiments. That is, a SORS implementation is contemplated as being scalable to serve multiple customers/tenants with tens of thousands of devices/gateways, such as branch gateways and VPNCs. Accordingly, the CBS should have the capacity/capability of supporting a large number of such devices. To provide the requisite capability to the CBS of SORS implementation, the CBS is configured to be horizontally scalable to serve multiple branch gateways. Additionally, the CBS can be a pseudo-stateless service, and can therefore serve multiple tenants at the same time without any hard-binding. For example, binding is the process of linking network components on different levels to enable communication between those components, so hard-binding similarly links network components, but with a greater force to use link the components. In some examples, a function manually calls an explicit binding to force the use of an object's context no matter where and how that function is called. In some examples, without hard-binding, the same customer can access different CBS and, with hard-binding, devices from different customers can land on the same CBS. That is, any CBS server/instance can service any device belonging to any tenant. It should be noted, as described above, that in contrast, tenants may be hard-bound to a particular PCM cluster, e.g., only one PCM instance can service a request from any device belonging to a tenant.

In some embodiments, the CBS may implement BGP route-reflector functionality, wherein instead of requiring each BGP system to peer with every other BGP system, peering occurs between BGP system and a route reflector. Routing advertisements can then be sent to the route reflector which can be reflected out to other BGP systems. Accordingly, cloud BGP instance 310A may include a KV pub/sub function 310A-1 to allow for state synchronization with branch gateways and route pub/sub and a peer/message handler 310A-2 (which can be extended to support other payload types, e.g., tunnel operational status, and traffic engineering routes). It should be understood that a CBS can maintain states (hence not fully stateless/pseudo stateless as noted above) for device updates it may have received, but is stateless in terms of the devices it can serve (i.e., the CBS has no tenant affinity). As described above, a distributed KV store can be used to support the route monitoring (pub-sub) commensurate with KV pub/sub function 310A-1, as well as support PCM leadership functionality, e.g., master PCM scheduler election and PCM discovery. Accordingly, PCM service instance 300 may include a distributed KV store adapter 306.

It should be noted that use of the conventional BGP routing stack as a route reflector is not possible (hence use of cloud BGP disclosed herein), not only due to inability to scale, but because conventional BGP utilizes TCP for transport making it difficult to load-balance connections coming from different tenants into a tenant-specific PCM service. As noted above, load balancing (based on the identity of a tenant (tenant-id) can be performed, where all traffic belonging to a particular tenant is sent to its corresponding/assigned PCM.

Figure 4:
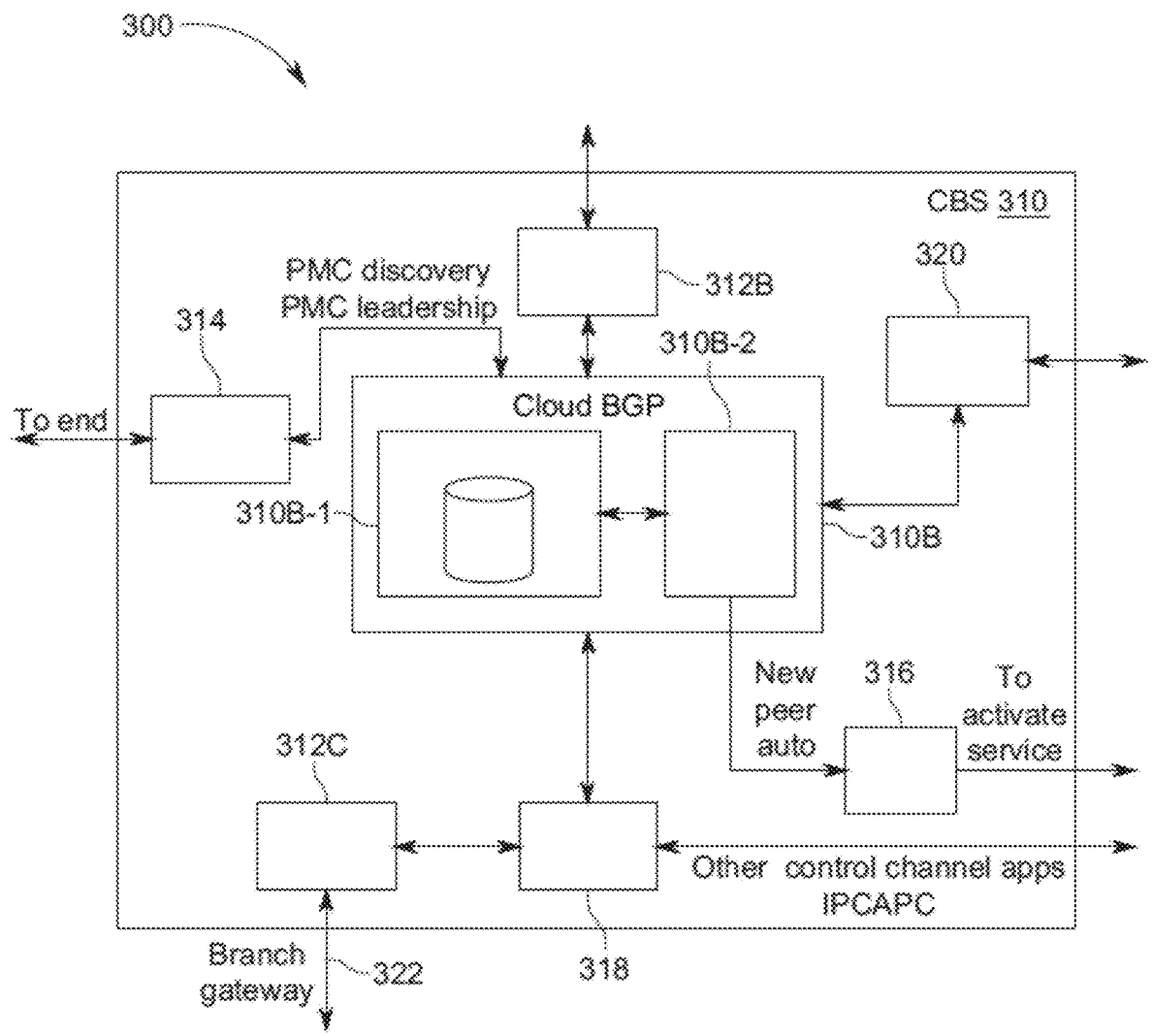
FIG. 4 illustrates a schematic representation of an example cloud branch gateway protocol service in accordance with embodiments of the technology disclosed herein.

FIG. 4 illustrates a schematic representation of a CBS instance 310 in accordance with one embodiment. The components/functionality of CBS instance 310 are similar/correspond to those described above regarding PCM service instance 300. That is, CBS instance 310 may include an RPC, such as gRPC 312B, for transport purposes to facilitate communications between PCM service instance 300 and CBS instance 300 and gRPC 312C to facilitate communications with branch gateways of a tenant (e.g., branch gateway 322). Like PCM service instance 300, CBS instance 310 may comprise a cloud BGP instance 310B. Cloud BGP instance 310B may include a KV pub/sub function 310B-1 to allow for state synchronization with branch gateways and route pub/sub and a peer/message handler 310B-2 (which can be extended to support other payload types, e.g., tunnel operational status, and traffic engineering routes). As described above, PCM leadership functionality, e.g., master PCM scheduler election and PCM discovery can be supported via a distributed KV store. Accordingly, CBS instance 310 may include a distributed KV store adapter 314.

As noted above, cloud BGP can use route reflectors for peering, and thus, CBS instance 300 may include an authentication component 316 for new peer authentication and to activate service between devices. Also like PCM service instance 300, CBS instance 310 may include a monitoring/debugging API(s) 320 that can be called by a user via a REST server (not shown). Moreover, CBS instance 310 may include a control channel multiplexer/demultiplexer 318 for handling other control channel application calls/communications, e.g., inter-process communications (IPCs) and RPCs.

Figure 5:
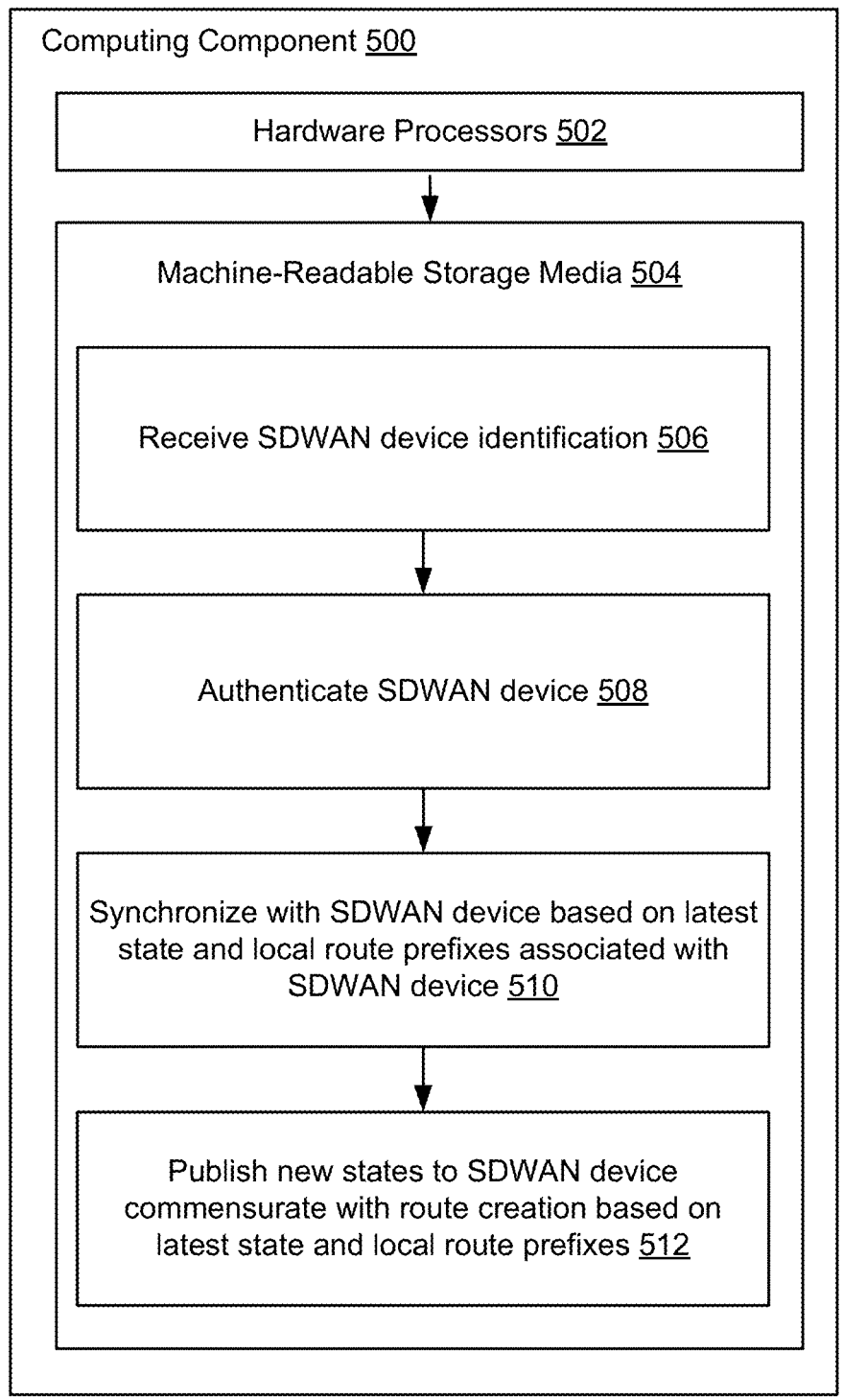
FIG. 5 illustrates an example computing component in accordance with various embodiments of the technology disclosed herein.

FIG. 5 is a block diagram of an example computing component or device 500 for performing service assurance functions in accordance with one embodiment. Computing component 500 may be, for example, a server computer, a controller, or any other similar computing component capable of processing data, and realizing the functionality of an assurance engine. In the example implementation of FIG. 5, computing component 500 includes a hardware processor 502, and machine-readable storage medium 504. In some embodiments, computing component 500 may be an embodiment of a processor.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-512, to control processes or operations for establishing connections, synchronizing, and publishing routes/states. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 504-512.

Hardware processor 502 may implement functionality of one or more components/elements of a SORS, such as SORS 201 (FIG. 2), and may execute instruction 506 to receive a SDWAN device identification. That is, the CBS (implemented across one or more CBS servers in a SORS) and PCM service (implemented across one or more PCM servers in a SORS) may come up/initialize operation. The branch gateways of tenant SDWAN devices, e.g., branch gateways and VPNCs, may also initialize operation, at which point the branch gateways will connect to the SORS using the specific DNS/VIP of the SORS using corresponding branch gateway. Again, a specific DNS/VIP is used to isolate control plane traffic from other management traffic. At this point, the branch gateways can identify themselves to the SORS. Branch gateway identification information can include device serial number, tenant identifier, authentication token, etc.

Hardware processor 502 may execute instruction 508 to authenticate the SDWAN device. In particular, the CBS of the SORS will authenticate the branch gateway by matching the branch gateway identification information received from the branch gateway with identification information maintained in an authentication server or database. As described above with respect to FIG. 4, authentication can be performed by the CBS using authentication component 316. As described above, in some embodiments, the branch gateway can insert custom HTTP headers to identify the tenant of the branch gateway. It should be noted that if authentication fails, the connection between the branch gateway and CBS can be reset.

Hardware processor 502 may execute instruction 510 to synchronize with the SDWAN device based on the latest route state and local route prefixes associated with the SDWAN device. That is, the branch gateway and CBS can synchronize or resynchronize route information, and the branch gateway can upload all required route states and tenant prefix associated with the branch gateway. It should be understood that local routes or route prefixes can be learned via the underlay routing stack, which the branch gateway can push to the PCM via the CBS over a channel. In some embodiments, the CBS can mark all existing routes created by the PCM as being stale, and can wait for route updates from a new PCM master in the event of a PCM failure. If any routes do not end up being updated, the CBS can mark those routes as being deleted routes, and again, the branch gateways can be synchronized with the PCM.

In turn, the PCM can process these latest route states/prefixes (i.e., updated route/path information) and create new routes/paths. That is, hardware processor 502 may execute instruction 512 to publish the new states to the SDWAN device commensurate with the newly created routes/paths based on the latest route states/prefixes.

Figure 6:
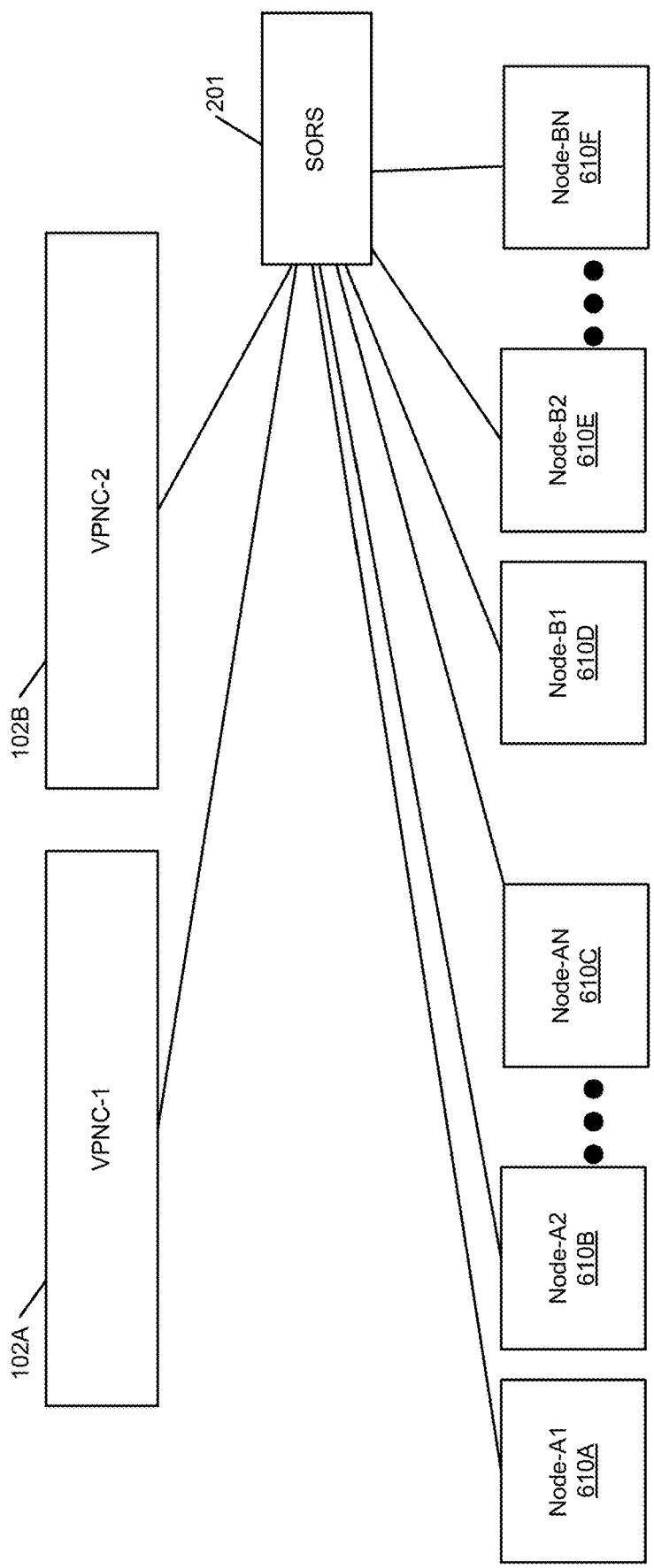
FIG. 6 illustrates a schematic representation of a subset of virtual private network clients (VPNCs), node devices, and SDWAN overlay routing service (SORS) in accordance with embodiments of the technology disclosed herein.

FIG. 6 illustrates a schematic representation of a subset of virtual private network clients (VPNCs), node devices, and SDWAN overlay routing service (SORS) in accordance with embodiments of the technology disclosed herein. Nodes 610 (illustrated as Node-A1 610A, Node-A2 610B, Node-AN 610C, Node-131 610D, Node-B2 610E, Node-BN 610F) and the VPNC devices at remote locations 102 may create a two-layer hierarchy of devices that communicate with SORS 201 and/or also communicate with each other. The subset of devices is provided for illustrative purposes only and should not limit embodiments discussed herein.

Nodes 610 may advertise their connectivity information in-band or out-band with devices or services in the cloud network, in a third party network (e.g., a client network), or elsewhere. In this example, the connectivity information is transmitted to SORS 201 (e.g., advertising routes, IPSec tunnel connectivity, etc.). SORS 201 may receive the connectivity information and use it to determine which node is connected to which particular devices and how they are connected. In some examples, SORS 201 may implement a route reflector (RR) process to receive available routes from nodes 610 (e.g., moving the RR process from VNPC to SORS). In other embodiments, the connectivity information may be broadcast (e.g., unicast, etc.).

In some examples, SORS 201 can group nodes 610 as compute devices or input/output (I/O) devices. A subset of nodes 610 may be grouped based on sharing a similar connectivity graph. For example, Node-A1 610A, Node-A2 610B, Node-AN 610C connects the VPNC-1 as primary gateway, and VPNC-2 as secondary gateway, as such grouped as one group "Branch Group A 620A." The path computation module (PCM) can compute routes for the entire group at once. The resulting best routes and alternate best routes may be stored in a data store (e.g., a common data table, etc.). CBS servers 210a-210d can advertise the routes from this common data store to all devices of the group.

In some examples, SORS 201 can compute a topology graph (e.g., a topological structure of a network using depictions of nodes 610 and connections between each as links or lines between the nodes). The topology graph can identify the communications and data flow between the components (e.g., nodes 610, VPNC devices at remote locations 102, etc.) based on the logical topology of the network.

Using the connectivity information and/or topology graph, SORS 201 can determine which nodes should receive connectivity information from other nodes. These nodes may be grouped to, for example, implement a single route computation for the group, reduce the number of electronic communications transmitted throughout the network, and/or increase computational efficiency for the controller and devices.

Figure 7:
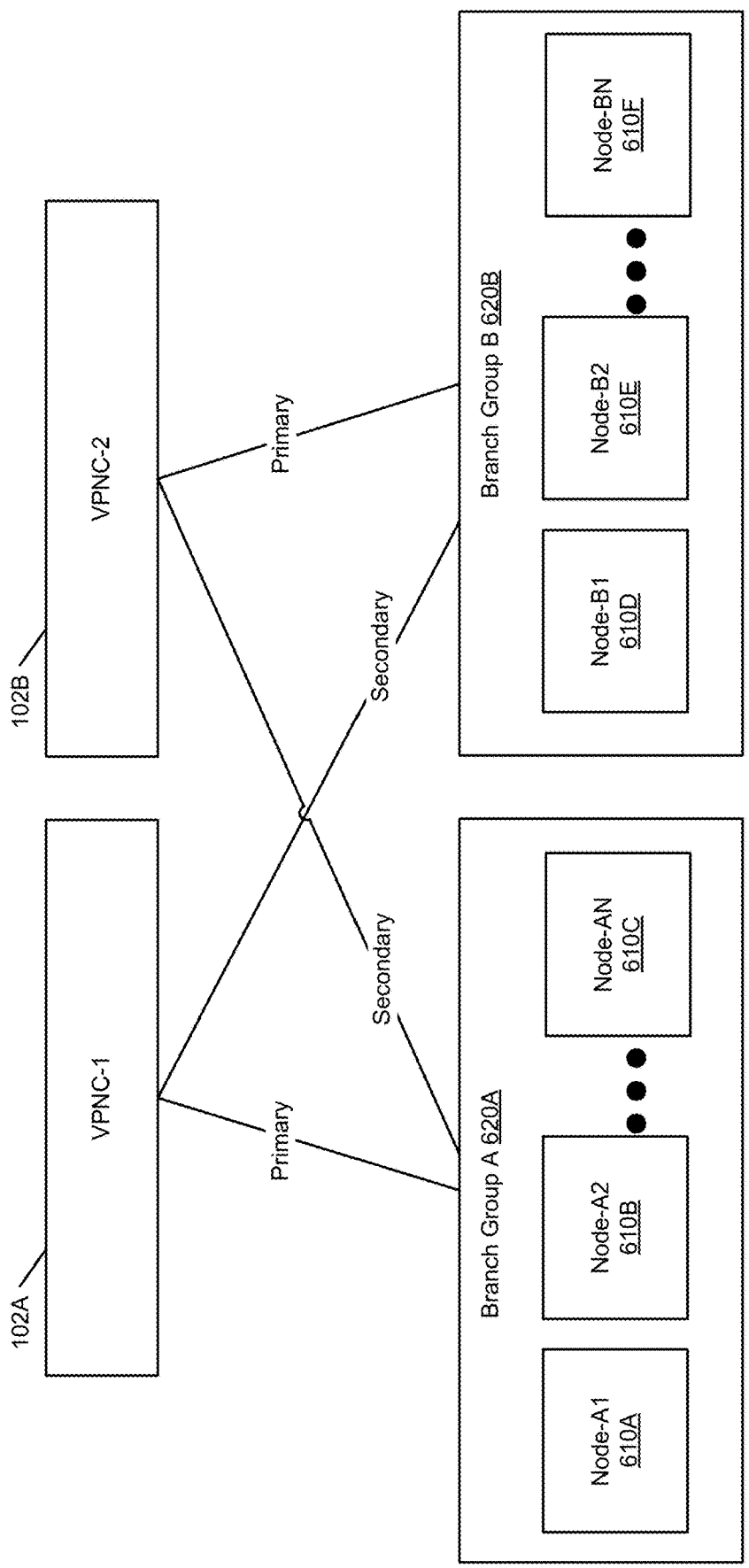
FIG. 7 illustrates group branch devices based on route information in accordance with embodiments of the technology disclosed herein.

FIG. 7 illustrates group branch devices based on route information in accordance with embodiments of the technology disclosed herein. For example, nodes 610 (illustrated as Node-A1 610A, Node-A2 610B, Node-AN 610C, Node-131 610D, Node-B2 610E, Node-BN 610F) can be grouped with similar nodes which would customarily receive similar route information and/or properties (e.g., AS-PATH, cost, MED, Metric1, Metric2, community/extended community). In this example, Node-A1 610A, Node-A2 610B, and Node-AN 610C can be grouped in a first branch group and Node-131 610D, Node-B2 610E, and Node-BN 610F can be grouped in a second branch group, such that similar nodes 610 can be grouped together as branch groups 620 (illustrated as Branch Group A 620A and Branch Group B 620B).

In some examples, SORS 201 may auto-group all branch gateways as branch groups 620 and each branch group 620 may be associated with VPNC-1 and VPNC-2 as primary and/or secondary VPN concentrator. For example, branch group A 620A may have VPNC-1 at a first remote location 102A as a primary VPN concentrator and VPNC-2 at a second remote location 102B as a secondary VPN concentrator. The second branch group may also be assigned VPN concentrators, including branch group B 620B may have VPNC-2 at a second remote location 102B as a primary VPN concentrator and VPNC-1 at a first remote location 102A as a secondary VPN concentrator.

The primary and secondary designation may be determined based on user intent and/or feedback after branch groups 620 are determined. For example, an administrative user may identify that a first group is a primary and the second group is secondary.

Once nodes 610 are grouped as branch groups 620, SORS 201 can compute the route per group. This can help save compute resources since SORS 201 may not need to compute individual routes for each node or branch gateway and may abstract the route computations for nodes that are previously determined to be similar for one or more characteristics.

The computed routes may be provided or advertised to each node 610. For example, simply creating branch groups 620 may not be sufficient to implement the auto-group routing. As an illustration, Node-A1 610A may have a first route and SORS 201 may advertise the route to each of the other nodes. If Node-A1 610A receives its own route when SORS 201 advertises routes to branch group A 620A, it can create a routing loop. In this instance, SORS 201 may help ensure that it doesn't re-advertise the route of Node-A1 610A to the same node or peer node by tagging each route with a site identifier (e.g., defaults to MAC of advertising devices, etc.). The site identifier may be a device property.

When tagging is implemented, branch group A 620A can receive the route and ignore the routes which are tagged with its own site identifier. In this example, any route loops may be avoided by the advertising device not at the receiving device.

In some examples, SORS 201 may advertise routes to auto-grouped branch gateways without creating routing loop and help implement a highly scalable routing stack.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 8:
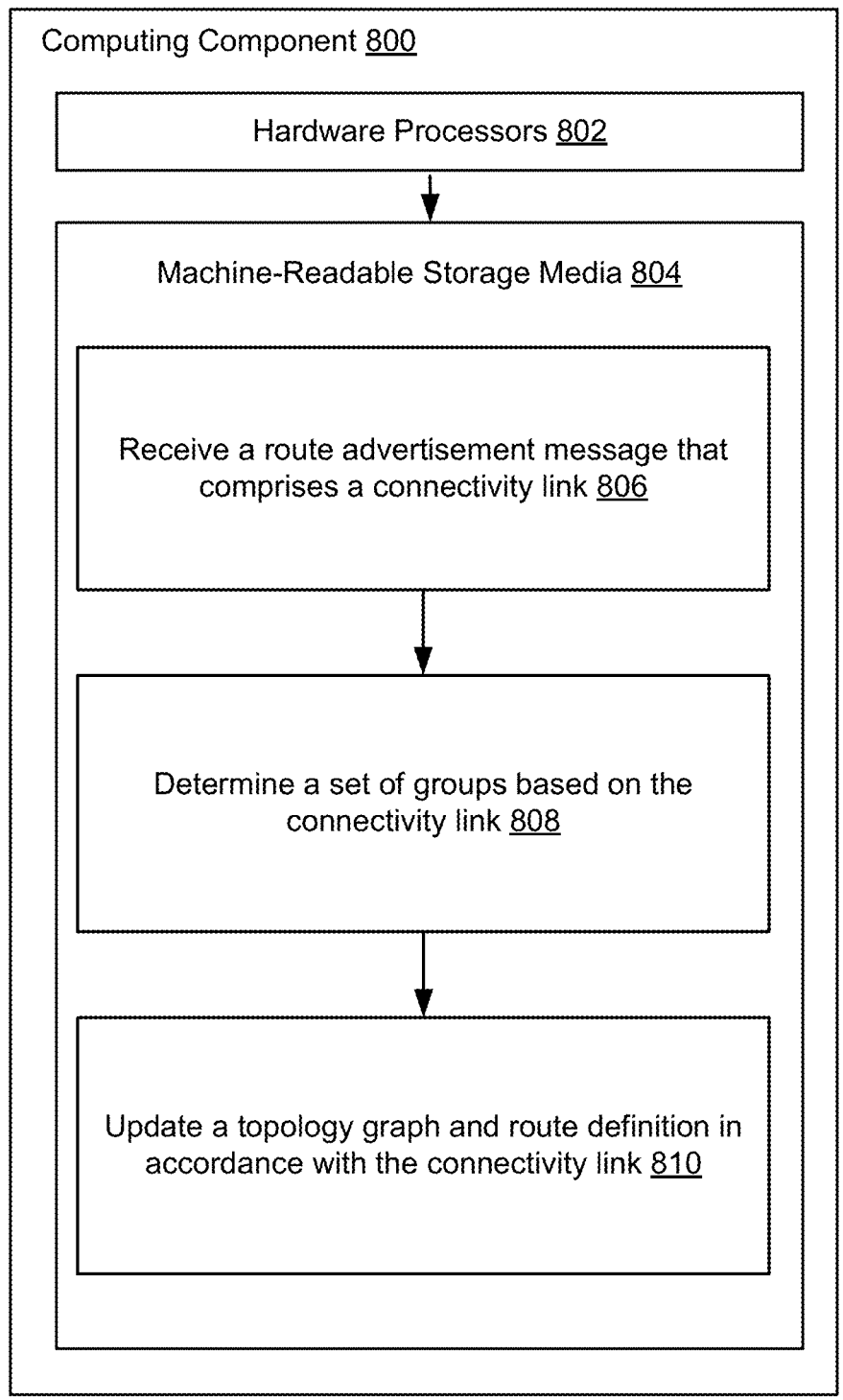
FIG. 8 illustrates an example computing component in accordance with various embodiments of the technology disclosed herein.

FIG. 8 illustrates an example computing component that may be used to implement burst preloading for available bandwidth estimation in accordance with various embodiments. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-810, to control processes or operations for burst preloading for available bandwidth estimation. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810.

Hardware processor 802 may execute instruction 806 to receive a route advertisement that comprises a connectivity link. For example, hardware processor 802 may receive, from a plurality of nodes, a route advertisement message that comprises a connectivity link between each of the plurality of nodes and a Virtual Private Network Concentrator (VPNC).

Hardware processor 802 may execute instruction 808 to determine a set of groups based on the connectivity link. For example, hardware processor 802 may determine a set of groups of the plurality of nodes based on the connectivity link between each of the plurality of nodes and the VPNC.

Hardware processor 802 may execute instruction 810 to update a topology graph and route definition in accordance with the connectivity link. For example, hardware processor 802 may update a topology graph and route definition in accordance with the connectivity link for each of the set of groups. The plurality of nodes may be enabled to route data packets in accordance with the topology graph and route definition.

Figure 9:
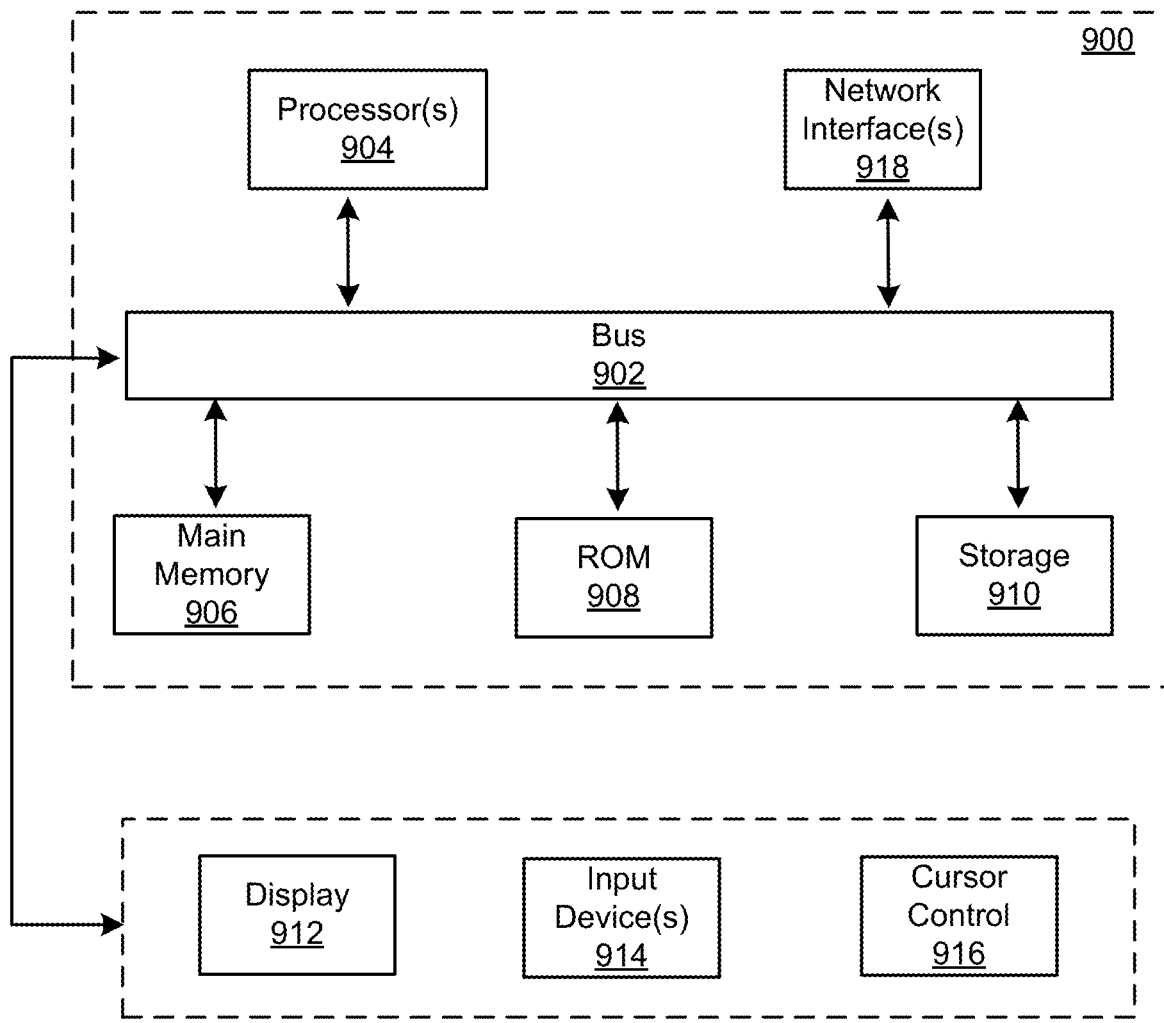
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a network interface 918 coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 918, which carry the digital data to and from computer system 900, are example forms of transmission media.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A control system comprising:
   one or more processors; and
   a non-transitory machine-readable storage medium comprising instructions executable by the one or more processors to:
   receive, from a plurality of nodes, route advertisement information of connectivity links between the plurality of nodes and Virtual Private Network Concentrators (VPNCs);
   determine groups of the plurality of nodes based on: device information associated with a respective node; a first similarity between branch gateways of the respective node and one or more other nodes; a second similarity between connectivity graphs of the respective node and one or more other nodes; and the connectivity links between the plurality of nodes and the VPNCs;
   based on at least one performance factor, compute a first performant route and a first alternative performant route for a first group of the groups, and compute a second performant route and a second alternative performant route for a second group of the groups
   associate a primary VPNC and a secondary VPNC with the first group, and associate a primary VPNC and a secondary VPNC with the second group, wherein the primary VPNC associated with the first group is different from the primary VPNC associated with the second group;
   download the first performant route and the first alternative performant route to the first group comprising nodes of the plurality of nodes, and download the second performant route and the second alternative performant route to the second group comprising nodes of the plurality of nodes; and
   update a topology graph for each group of the groups in accordance with computed performant routes and alternative performant routes including the first performant route and the first alternative performant route for the first group, and the second performant route and the second alternative performant route for the second group, wherein the plurality of nodes are enabled to route data packets in accordance with the topology graph, and wherein a node of the first group is to switch from the first performant route to the first alternative performant route responsive to a network disruption.

2. The control system of claim 1, wherein the instructions are executable by the one or more processors to:
   determine which nodes of the first group is to receive connectivity information from a further node of the first group.

3. The control system of claim 2, wherein the instructions are executable by the one or more processors to:
   perform a single route computation for the first group, the single route computation comprising computing the first performant route and the first alternative performant route; and
   download the first performant route and the first alternative performant route from the control system to the further node of the first group that is to communicate the first performant route and the first alternative performant route to other nodes of the first group.

4. The control system of claim 1, wherein the instructions are executable by the one or more processors to:
   perform a first single route computation for the first group, wherein the first single route computation comprises computing the first performant route and the first alternative performant route; and
   perform a second single route computation for the second group, wherein the second single route computation comprises computing the second performant route and the second alternative performant route.

5. The control system of claim 1, wherein a first node of the first group comprises a primary branch gateway connected to the primary VPNC associated with the first group, and a second node of the first group comprises a secondary branch gateway connected to the secondary VPNC associated with the first group.

6. The control system of claim 1, wherein the control system comprises a software defined wide area network (SDWAN) control system.

7. The control system of claim 1, wherein the at least one performance factor comprises at least one of route speed or number of hops.

8. A method comprising:
   receiving, by a control system comprising a hardware processor from a plurality of nodes, route advertisement information of connectivity links between the plurality of nodes and Virtual Private Network Concentrators (VPNCs);
   determining, by the control system, a set of groups of the plurality of nodes based on: device information associated with a respective node; a first similarity between branch gateways of the respective node and one or more other nodes; a second similarity between connectivity graphs of the respective node and one or more other nodes; and the connectivity links between the plurality of nodes and the VPNCs;
   based on at least one performance factor, computing, a first performant route and a first alternative performant route for a first group of the groups, and computing a second performant route and a second alternative performant route for a second group of the groups;
   associating, by the control system, a primary VPNC and a secondary VPNC with the first group, and associating, by the control system, a primary VPNC and a secondary VPNC with the second group, wherein the primary VPNC associated with the first group is different from the primary VPNC associated with the second group;
   downloading, by the control system, the first performant route and the first alternative performant route to the first group comprising nodes of the plurality of nodes, and downloading, by the control system, the second performant route and the second alternative performant route to the second group comprising nodes of the plurality of nodes; and
   updating, by the control system, a topology graph for each group of the groups in accordance with computed performant routes and alternative performant routes including the first performant route and the first alternative performant route for the first group, and the second performant route and the second alternative performant route for the second group, wherein the plurality of nodes are enabled to route data packets in accordance with the topology graph, and wherein a node of the first group is to switch from the first performant route to the first alternative performant route responsive to a network disruption.

9. The method of claim 8, comprising:
determining, by the control system, which nodes of the first group is to receive connectivity information from a further node of the first group.

10. The method of claim 9, comprising:
performing, by the control system, a single route computation for the first group, the single route computation comprising computing the first performant route and the first alternative performant route; and
downloading, by the control system, the first performant route and the first alternative performant route to the further node of the first group that is to communicate the first performant route and the first alternative performant route to other nodes of the first group.

11. The method of claim 8, comprising:
performing, by the control system, a first single route computation for the first group, wherein the first single route computation comprises computing the first performant route and the first alternative performant route; and
performing, by the control system, a second single route computation for the second group, wherein the second single route computation comprises computing the second performant route and the second alternative performant route.

12. The method of claim 8, comprising:
detecting, by the node of the first group, the network disruption; and
switching, by the node of the first group, from the first performant route to the first alternative performant route based on detecting the network disruption.

13. The method of claim 8, wherein a first node of the first group comprises a primary branch gateway connected to the primary VPNC associated with the first group, and a second node of the first group comprises a secondary branch gateway connected to the secondary VPNC associated with the first group.

14. The method of claim 8, wherein the at least one performance factor comprises at least one of route speed or number of hops.

15. A non-transitory computer-readable storage medium comprising instructions executable by a control system to:
receive, from a plurality of nodes, route advertisement information of connectivity links between the plurality of nodes and Virtual Private Network Concentrators (VPNCs);
determine groups of the plurality of nodes based on: device information associated with a respective node; a first similarity between branch gateways of the respective node and one or more other nodes; a second similarity between connectivity graphs of the respective node and one or more other nodes; and the connectivity links between the plurality of nodes and the VPNCs;
based on at least one performance factor, compute, a first performant route and a first alternative performant route for a first group of the groups, and compute a second performant route and a second alternative performant route for a second group of the groups;

associate a primary VPNC and a secondary VPNC with the first group, and associate a primary VPNC and a secondary VPNC with the second group, wherein the primary VPNC associated with the first group is different from the primary VPNC associated with the second group;
download, from the control system, the first performant route and the first alternative performant route to the first group comprising nodes of the plurality of nodes, and download, from the control system, the second performant route and the second alternative performant route to the second group comprising nodes of the plurality of nodes; and
update a topology graph for each group of the groups in accordance with computed performant routes and alternative performant routes including the first performant route and the first alternative performant route for the first group, and the second performant route and the second alternative performant route for the second group, wherein the plurality of nodes are enabled to route data packets in accordance with the topology graph, and wherein a node of the first group is to switch from the first performant route to the first alternative performant route responsive to a network disruption.

16. The non-transitory computer-readable storage medium of claim 15, wherein the instructions are executable by the control system to:
determine which nodes of the first group is to receive connectivity information from a further node of the first group.

17. The non-transitory computer-readable storage medium of claim 16, wherein the instructions are executable by the control system to:
perform a single route computation for the first group, the single route computation comprising computing the first performant route and the first alternative performant route; and
download, from the control system, the first performant route and the first alternative performant route to the further node of the first group that is to communicate the first performant route and the first alternative performant route to other nodes of the first group.

18. The non-transitory computer-readable storage medium of claim 15, wherein the instructions are executable by the control system to:
perform a first single route computation for the first group, wherein the first single route computation comprises computing the first performant route and the first alternative performant route; and
perform a second single route computation for the second group, wherein the second single route computation comprises computing the second performant route and the second alternative performant route.

19. The non-transitory computer-readable storage medium of claim 15, wherein a first node of the first group comprises a primary branch gateway connected to the primary VPNC associated with the first group, and a second node of the first group comprises a secondary branch gateway connected to the secondary VPNC associated with the first group.

20. The non-transitory computer-readable storage medium of claim 15, wherein the at least one performance factor comprises at least one of route speed or number of hops.

* * * * *